May 23, 1933.  W. J. FIEGEL ET AL  1,910,285
APPARATUS FOR FORMING BEARINGS
Filed May 23, 1932   3 Sheets-Sheet 2

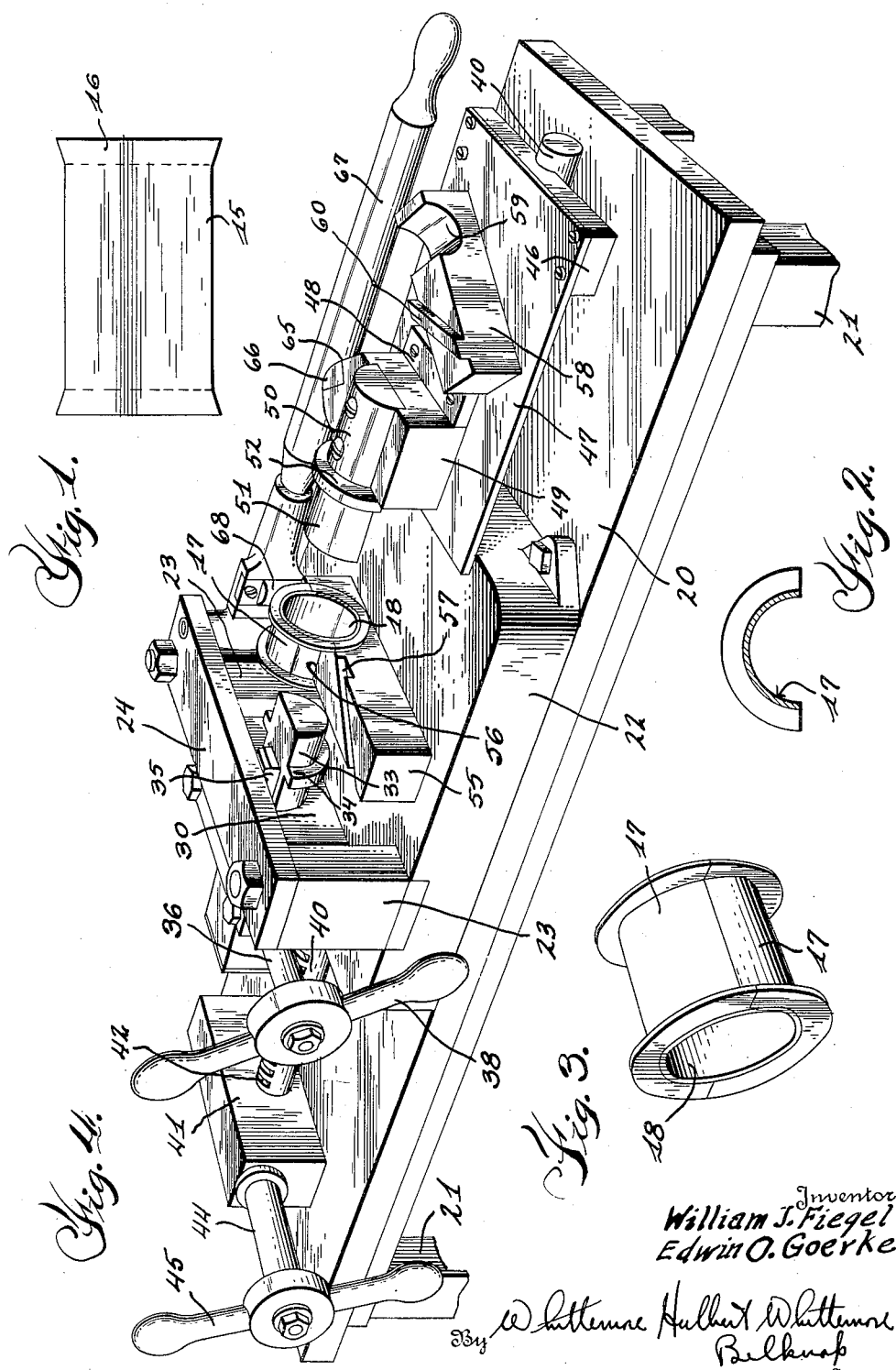

Inventors
William J. Fiegel
Edwin O. Goerke

Attorneys

May 23, 1933.  W. J. FIEGEL ET AL  1,910,285
APPARATUS FOR FORMING BEARINGS
Filed May 23, 1932  3 Sheets-Sheet 3
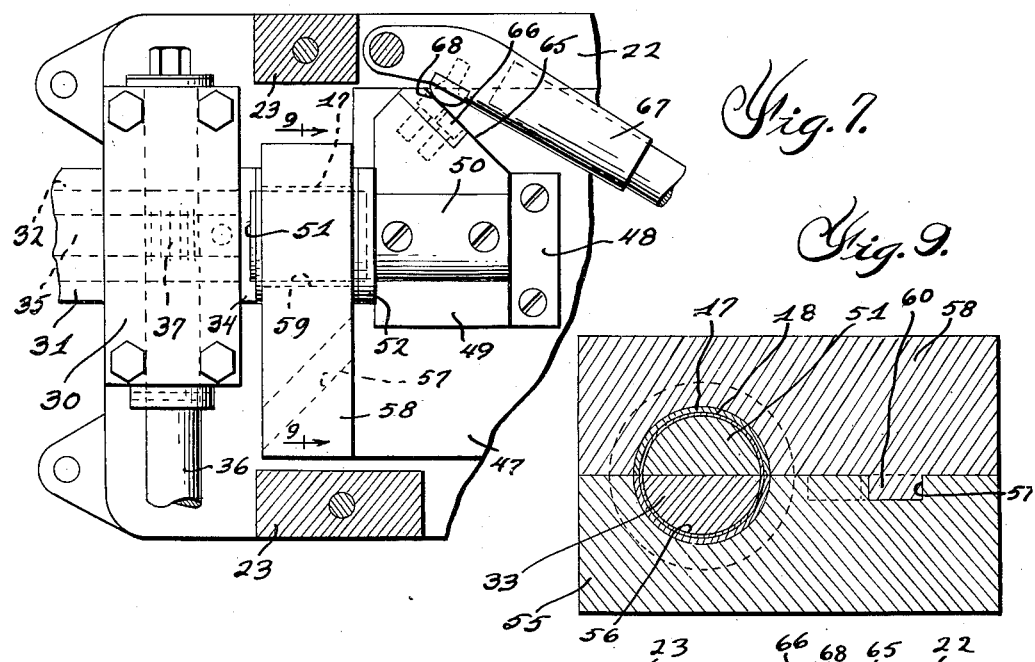
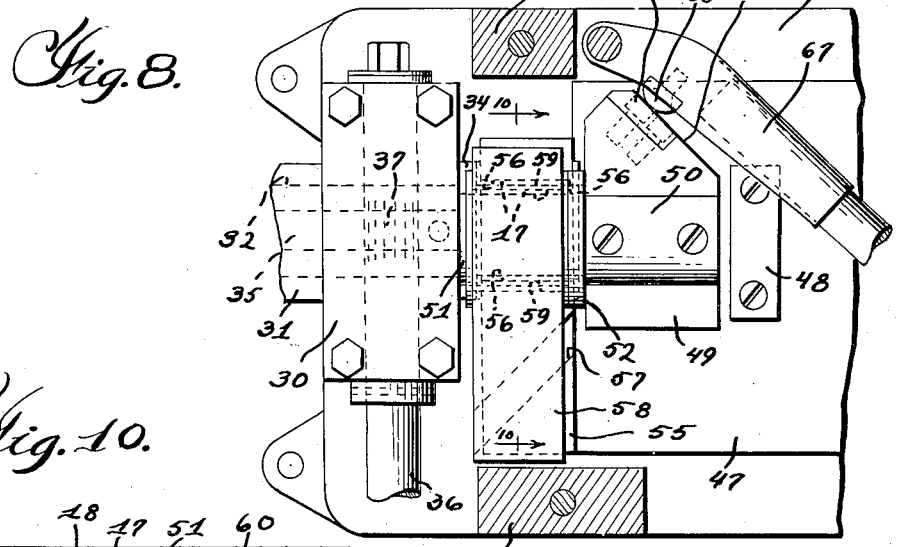
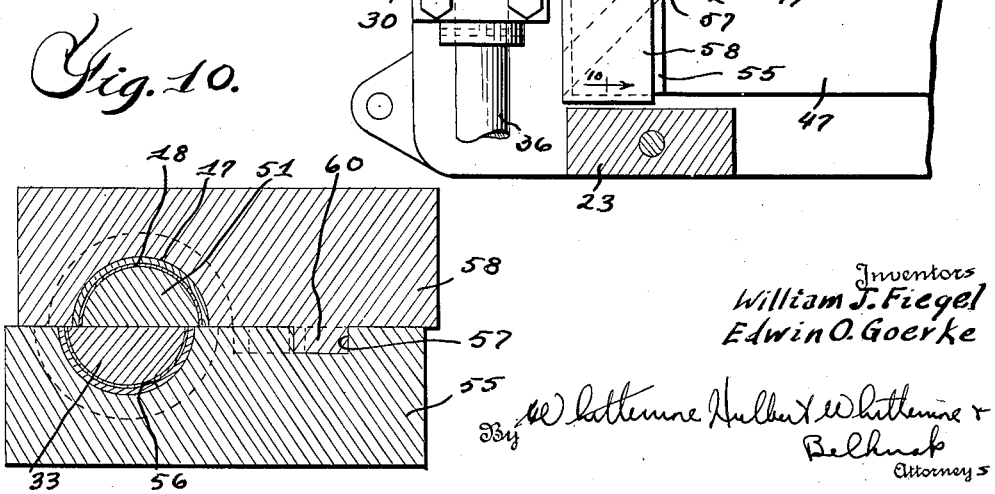
Inventors
William J. Fiegel
Edwin O. Goerke Patented May 23, 1933

1,910,285

UNITED STATES PATENT OFFICE

WILLIAM J. FIEGEL AND EDWIN O. GOERKE, OF DETROIT, MICHIGAN, ASSIGNORS TO BOHN ALUMINUM AND BRASS CORPORATION, OF DETROIT, MICHIGAN, A CORPORATION OF MICHIGAN

APPARATUS FOR FORMING BEARINGS

Application filed May 23, 1932. Serial No. 613,088.

This invention relates to a method of forming bearings and to an apparatus which may be used in the practicing of this method.

One of the primary objects of this invention is to provide a method by which half bearings or other bearing sections may be accurately formed so that when the bearing sections are assembled they will produce a substantially perfect whole bearing.

The invention further contemplates the provision of a method in which the several machining operations necessary in the forming of the bearing may be performed on the several bearing sections while the latter are assembled to form a whole bearing.

The invention contemplates the provision of a method by which the several bearing sections may be conveniently secured together during the machining operations and then readily separated from each other after the machining operations have been completed.

The invention further contemplates the provision of an apparatus for use in practicing the method, which apparatus will facilitate the separating of the bearing sections after the machining and like operations have been performed on the same.

Numerous other objects and advantages of this invention will become more apparent as the following description proceeds, particularly when reference is had to the accompanying drawings, wherein:

Fig. 1 is a plan view of a blank from which a bearing section is formed;

Fig. 2 is a sectional view through a partially formed bearing section;

Fig. 3 is a perspective view of two bearing sections secured together, the inner surfaces of these sections being babbitted;

Fig. 4 is a perspective view of an apparatus adapted for use in separating the bearing sections;

Fig. 7 is a sectional view taken substantially on the line 7—7 of Fig. 6;

Fig. 8 is a view similar to Fig. 7 showing the parts of the apparatus in the positions they assume after the bearing sections have been separated from each other;

Fig. 9 is a sectional view taken substantially on the line 9—9 of Fig. 7; and

Fig. 10 is a sectional view taken substantially on the line 10—10 of Fig. 8.

Figure 5:
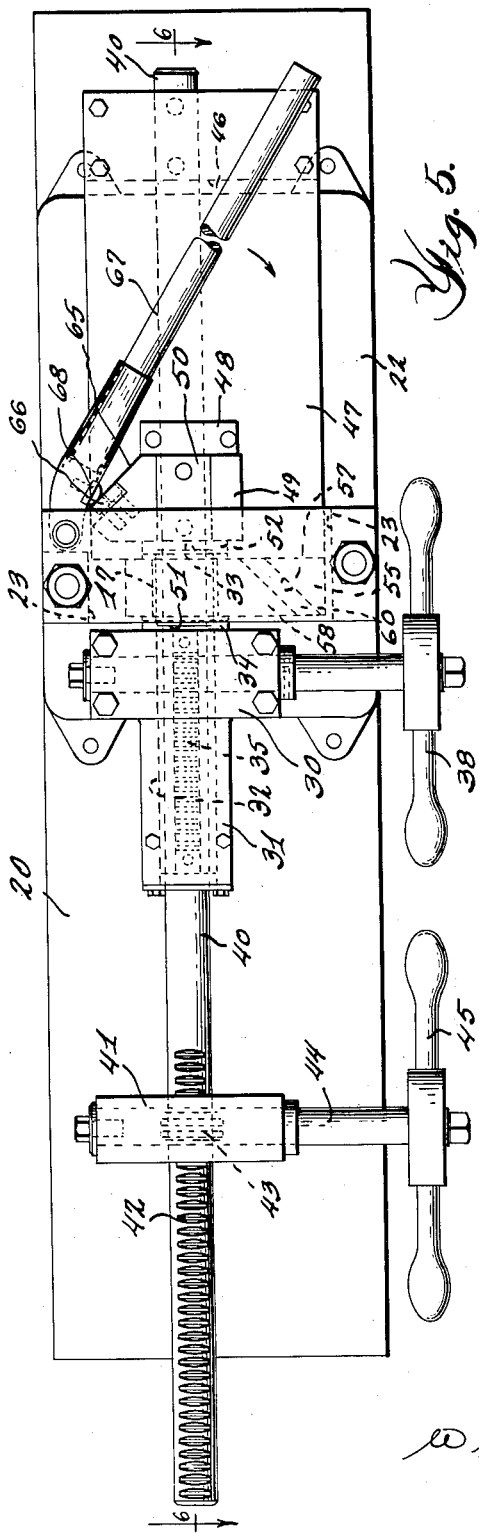
Fig. 5 is a plan view of the apparatus shown in Fig. 4.

In the forming of bearings it is the general practice to form the bearing in sections, there being generally two half sections which when assembled form the complete bearing. Heretofore it was customary to form these half bearing sections by first forming an integral whole bearing and then cutting this whole bearing in two to make the two half sections. The whole bearing was made oversize to provide the necessary material for the saw cut.

It is obvious that when a whole bearing was cut in the manner above mentioned the two halves were not true half circles. It was therefore necessary to form or shape each half section by a closing-in operation, but this operation did not convert a half section which had a greater diameter than necessary into a perfect half bearing of a smaller diameter. It was necessary to stretch the end flanges and outer surfaces of the half section and at the same time compress the inner surface thereof in an endeavor to form a half section having the necessary curvature. The results obtained by this method were never entirely satisfactory for the reason that it was substantially impossible to ever form a perfect half circle bearing.

The present invention contemplates the elimination of the difficulties encountered in the prior practice above discussed by a series of steps which will produce bearing sections, each of which will be of a size and have a curvature such that when the sections are assembled a perfect bearing will be formed. The method consists broadly in first forming two half bearing sections. These sections are clamped together and then coated interiorly, this coating holding the half sections together. While the half sections are thus held together the machining and like operations are performed on the same, with the result that a perfect whole bearing is produced. The bearing sections are then moved relative to each other to separate the same at their lines of connection to each other, with the result that the sections are obtained as substantially perfect half bearings.

More specifically the method consists in first cutting a piece of flat sheet metal to form a blank 15 such as illustrated in Fig. 1 of the drawings. It will be noted that this blank has the flaring end portions 16. This blank by successive stamping operations is formed into a half bearing such as illustrated in Fig. 2 of the drawings, the end portions 16 being bent on the lines indicated to form flanges on the ends of the half section. The half section is designated generally in Fig. 2 of the drawings by the reference character 17.

Two of these half sections are then suitably clamped together and the interior thereof is then babbitted to form a coating 18 such as illustrated in Fig. 3 of the drawings. Since this babbitting operation is generally performed by a centrifugal coating machine, the two half sections when secured together may be conveniently babbitted in the usual manner. This babbitt coating functions to hold the two half sections 17 of the bearing together, and while these half sections are thus held in assembled relation, the whole bearing thus formed is machined. As a result of this operation a substantially perfect whole bearing is formed, which bearing, however, comprises two half sections held together by a babbitt lining.

The whole substantially perfect bearing is then divided into its sections by exerting forces on the two half sections tending to move the same apart. This may be effected by shearing forces by which a shearing of the babbitt lining between the two half sections is effected with the result that there is obtained two substantially perfect half bearings.

The edges of the half bearings are then faced and the bearing is broached. It might be noted that the half bearings are preferably made about ten-thousandths of an inch oversize so that the bearing can be snapped into the recess in which it is to be used. Thus when the half bearings are sprung into a fixture there is sufficient material at the edges of the half bearing to allow for facing.

For the purpose of separating the half bearing sections after the machining operations and the like have been completed, the apparatus shown in Figs. 4 to 10, inclusive, may be utilized. This device is shown as comprising a base plate 20 suitably supported as for example by the legs 21. Bolted to the upper face of this base plate preferably substantially centrally thereof is a low housing 22 which supports a pair of uprights 23. A plate 24 is secured to the upper ends of these uprights and spans the space between the same for a purpose which will hereinafter be more fully described.

Figure 6:
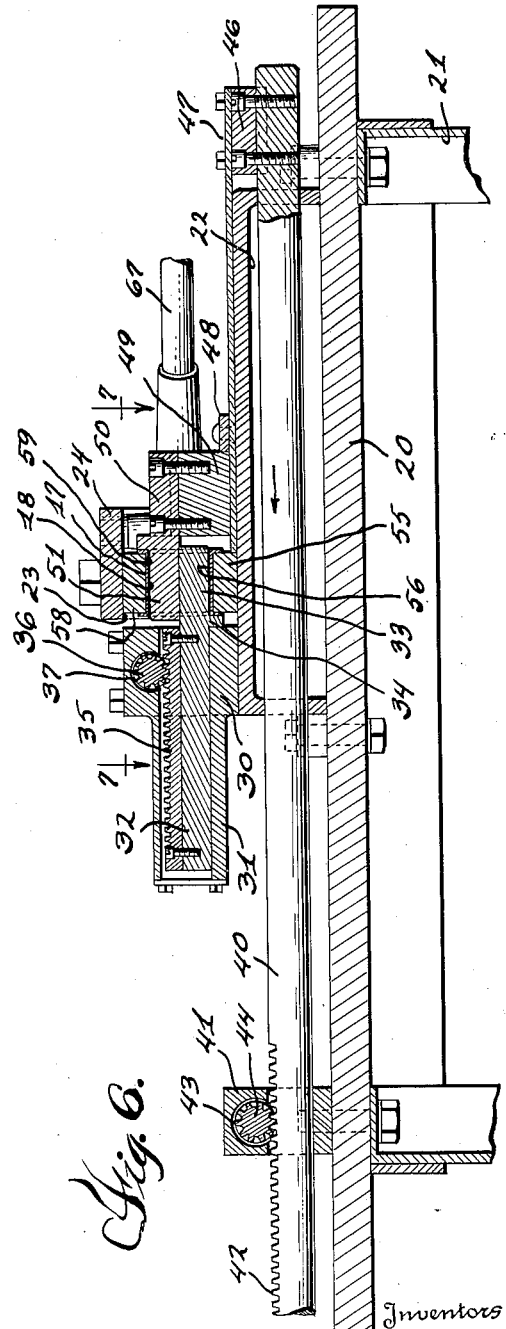
Fig. 6 is a sectional view taken substantially on the line 6—6 of Fig. 5.

Supported by the member 22 and adjacent the uprights 23 is a bearing 30 having an extended portion 31 for slidably receiving a rod 32. This rod carries at its one end a semi-cylindrical core 33 of a size sufficient to fit snugly within one of the half bearing sections. A flange 34 is formed on the core in a plane spaced inwardly from the free end of the core, and this flange constitutes a stop engageable with the bearing 30 to limit movement of the rod 32 inwardly of the bearings 30 and 31, as illustrated in Fig. 6 of the drawings.

For the purpose of reciprocating the core 33 a rack 35 is fixed to the upper face of rod 32, and a shaft 36 journaled in the member 30 above the rod 32 is provided with teeth 37 for engagement with the teeth on the rack 35. The shaft 36 extends to one side of the base plate and is provided with a handle 38 by which the shaft may be rotated to thus effect a reciprocable movement of core 33.

Mounted for reciprocation longitudinally of the base plate 20 is a shaft 40. This shaft has a bearing in the walls of the housing 22 and in a block 41 fixed to the base plate adjacent one end thereof. This shaft is provided on its upper face and adjacent its one end with the teeth 42 adapted to be engaged by teeth 43 formed on a shaft 44, this latter shaft being journaled in the block 41. A handle 45 fixed to shaft 44 provides means for rotating this shaft to thus effect a longitudinal reciprocation of shaft 40.

This shaft 40 passes entirely through the housing 22, and fixed to the end thereof beyond the housing is a block 46. Fixed to this block for movement therewith is a plate 47 which is adapted upon reciprocation of the shaft 40 to slide along the top of the housing 22.

Fixed to the plate 47 adjacent the free end thereof is a stop 48 against one side of which a block 49 is adapted to be positioned. This block has fixed thereto a member 50, and this member has formed on its end a half core member 51 complementary to the core member 33. A flange 52 is formed on the core 51 in a plane spaced inwardly from the free end thereof.

The reference character 55 designates a holding block having a semi-cylindrical recess 56 adapted to receive a half bearing section. This holder is also provided on its upper face with a groove 57 which is inclined to the longitudinal side faces of the block.

A second block 58 is provided, this block being similar to the block 55 in that it is provided with a recess 59 semi-circular in cross section which recess is adapted to receive a half bearing section. The block 58 is provided with a rib 60 adapted to be received in the groove 57 of the block 55.

The member 49 is provided on its one end with an inclined surface 65, and fixed in this surface adjacent one end thereof is a wear plate 66. Rotatably supported between the housing 22 and the plate 24 is one end of a lever 67, and this lever is provided with a wear plate 68 adapted to engage the wear plate 66 on the member 49. The arrangement is such that when the lever 67 is swung in the direction of the arrow in Fig. 5 of the drawings it engages the block 49 and exerts a force on the same which acts to move this block away from the stop 48.

In practicing the method and utilizing the apparatus above described, the blanks 15 are first stamped or otherwise shaped to form half bearings of the desired size and shape. Two of these half bearings are then clamped together in any desired manner, and the whole bearing thus formed is then coated interiorly with babbitt or the like. The babbitt lining will act to hold the half bearings together so that the several machining operations necessary in the forming of the bearing may be performed while the half bearings are held together to form a whole bearing.

After the bearing has been machined, the two half bearings may be separated from each other by exerting a force on the half bearings tending to move the same relative to each other along their line of union by the babbitt lining. This may be conveniently effected by utilizing the apparatus shown in Figs. 4 to 10, inclusive, of the drawings, this apparatus operating in the following manner.

It will be understood that the block 49 and holders 55 and 58 are not connected to the parts of the apparatus on which they rest and may, therefore, be positioned on the apparatus or removed therefrom at will. The whole bearing is placed in the holder 55 with the line of division between the half bearings in the plane of the top surface of this holder. The holder 58 is then assembled with relation to the holder 55, the rib 60 being engaged in the groove 57. The whole bearing will thus be held by the two holding blocks with the line of division between the half bearings in the plane of the line of division between the holding blocks. The assembled holder with the bearing in the same may then be placed on the support 22 with the bearing aligned with the core 33. The shaft 36 is then rotated to advance the core 33 until the latter engages the inner face of the lower half bearing, the flange 34 at this time engaging the adjacent end flange of this lower half bearing. The block 49 is then placed in position in advance of the stop or lug 48 and with the core 51 in alignment with the whole bearing.

The shaft 44 is then rotated to advance the plate 47 and to thus move the block 49 and core 51 to position the latter within the whole bearing and in engagement with the inner surface of the upper half bearing. The lug 48 is so positioned on the plate 47 that when the block 49 is positioned in advance of this lug, this block will be spaced such a distance from the free edge of the plate 47 that when the flange 52 on core 51 engages the adjacent flange on the upper half bearing, the free edge of the plate will also engage the adjacent side of the lower holder 55.

With the two core members engaged in the whole bearing, the two shafts 36 and 44 are then rotated together to move the holders, the bearings supported by these holders and the two cores into the position shown in Fig. 6 of the drawings. In this position it will be noted that the upper face of holder 58 will engage the under face of plate 24, while flange 34 will engage the adjacent face of member 30. Thus the lower holder 55 will be prevented from further movement in the direction indicated by the arrow in Fig. 6 of the drawings, while the upper holder 58, by virtue of its spaced relation from the member 30, may still be moved in this direction.

With the parts thus positioned, the lever 67 is actuated to engage the block 49 and to thus act to move this block in a direction away from the stop 48. The force exerted by the lever 67 on the block 49 is in such a direction as to tend to move this block in the direction of inclination of the groove 57 in the holder 55. Thus the upper holder 58 is moved diagonally with reference to the lower holder 55 thus effecting a shearing of the half bearings along their line of union.

After the shearing of the bearing sections has been completed it will be apparent that the parts of the device may be returned to the position shown in Fig. 4 of the drawings and the bearing sections removed from their respective holders. The bearing sections may then be broached and the edges thereof faced as previously mentioned.

From the above it will be apparent that the invention provides a method by which half bearing sections may be accurately and economically produced. During the machining operations these bearing sections will be held together by the interior lining which is formed on the same while the two sections are clamped together. Thus the bearing sections will be accurately formed with respect to each other and will thus together constitute a perfect whole bearing. The bearing sections may be separated without any loss of material between the same, with the result that the bearing sections will be of the correct size and shape.

While the invention has been described with some detail, it is to be understood that the description is for the purposes of illustration only and is not definitive of the limits of the inventive idea. It is believed apparent that the inventive principles disclosed may be utilized in the forming not only of half bearings as described, but also bearing sections which constitute any part of a whole bearing. The right is reserved to make such changes in the steps of the method and in the details of construction of the apparatus as will fall within the purview of the attached claims.

What we claim as our invention is:

1. In an apparatus of the class described, core members adapted to be inserted into a bearing formed of united sections, and means for effecting a relative movement between said core members in a direction to effect a separation of the sections of said bearing from each other.

2. In an apparatus of the class described, a pair of core members adapted to be inserted into a bearing formed of united half bearings, means for moving said core members in the direction of the axis of the bearing to position the core members within the bearing, and means for effecting a relative movement between said core members in a direction angularly disposed with reference to the axis of the bearing to effect a separation of the half bearings from each other.

3. In an apparatus of the class described, a pair of semi-cylindrical core members, means for positioning said core members in a bearing formed of united half bearings with the line of division between said core members coincident with the line of division between said half bearings, and means for effecting a relative movement between said core members to effect a shearing of said half bearings from each other.

4. In an apparatus of the class described, holders for receiving a bearing formed of united half sections, the line of division between said holders being coincident with the line of division between said half bearings, core members insertable into the bearing while the bearing is in said holders, and means for moving one of said core members relative to the other in a direction to exert a shearing force on one of said half bearings acting to separate the half bearings from each other.

5. In an apparatus of the class described, a pair of holders for receiving a whole bearing formed of united half bearings, guide means carried by said holders preventing sliding movement of said holders with reference to each other except in a predetermined direction, core members insertable into the whole bearing, and means for effecting a relative sliding movement between said core members and said holders in the said predetermined direction to effect a shearing of said half bearings from each other.

6. In an apparatus of the class described, a holding block having a semi-circular recess for receiving one half of a bearing formed of united half bearings, said holding block being provided with a groove inclined to the longitudinal edges thereof, a second holding block complementary to the first holding block for engaging the other half bearing of the whole bearing, said second holding block having a rib inclined to engage the groove in the first mentioned holding block, core members, means for moving said core members in the direction of the axis of the bearings supported by said holders for positioning said core members in the whole bearing, and means for moving one of said core members and one of said holders relative to the other core member and other holder and in a direction angularly disposed with reference to the axis of the whole bearing to effect a separation of said half bearings from each other.

7. In an apparatus of the class described, a support, holding blocks adapted to be positioned on said support and adapted to receive a whole bearing formed of united half bearings, a pair of semi-cylindrical core members, means including racks cooperating with said core members for moving the same axially of the whole bearing to a position within the whole bearing with the line of division between the core members coincident with the dividing line between the half bearings, and a lever carried by said support and arranged to move one of the core members in a direction angularly disposed with reference to the axis of the whole bearing to exert shearing forces on said half bearings to separate the same from each other.

In testimony whereof we affix our signatures.

WILLIAM J. FIEGEL.
EDWIN O. GOERKE.